(No Model.)
T. W. MORAN.
RELIEF VALVE.
No. 444,782. Patented Jan. 13, 1891.
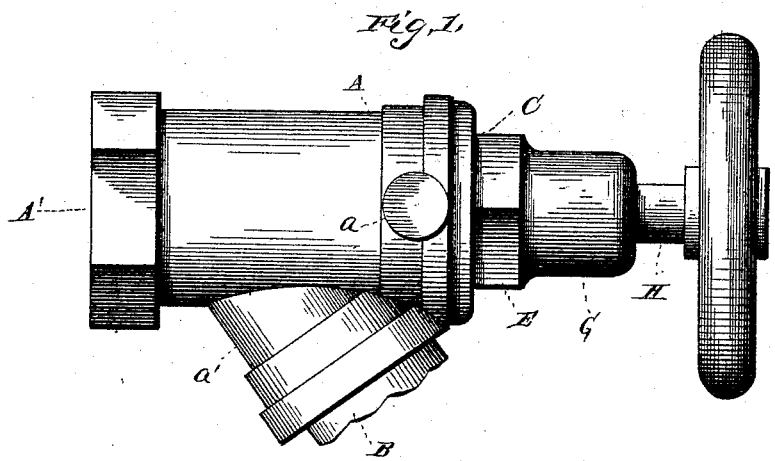
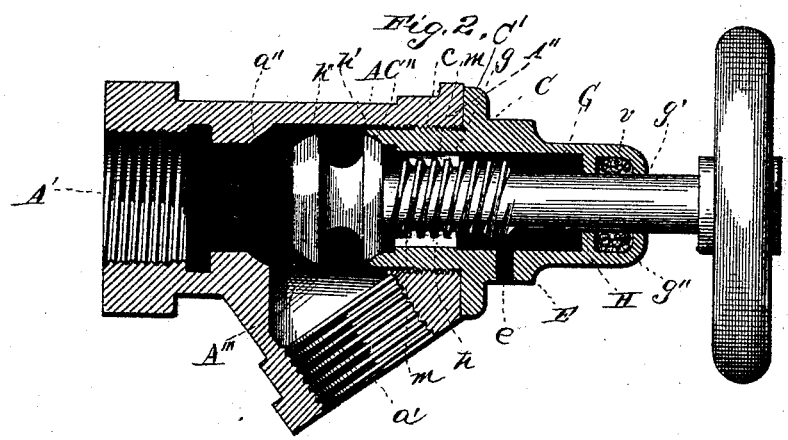
WITNESSES:
INVENTOR
Thomas W. Moran
BY
E. W. Anderson
his ATTORNEY.
THE NORRIS PETERS CO., PHOTO-LITHO., WASHINGTON, D. C.

UNITED STATES PATENT OFFICE.

THOMAS W. MORAN, OF LOUISVILLE, KENTUCKY, ASSIGNOR TO THE MORAN FLEXIBLE STEAM JOINT COMPANY, OF SAME PLACE.

RELIEF-VALVE.

SPECIFICATION forming part of Letters Patent No. 444,782, dated January 13, 1891.

Application filed February 24, 1890. Renewed November 28, 1890. Serial No. 372,969. (No model.)

*To all whom it may concern:*

Be it known that I, THOMAS W. MORAN, a citizen of the United States, and a resident of Louisville, in the county of Jefferson and State of Kentucky, have invented certain new and useful Improvements in Relief-Valves; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view of the valve. Fig. 2 is a central longitudinal section showing the valve open.

This invention has relation to relief-valves, designed more particularly for steam-brake work in railway-car construction; and it consists in the novel construction and combination of devices, all as hereinafter set forth, and pointed out in the appended claim.

In the accompanying drawings, the letter A designates the body of the valve-case, which is usually provided with the lateral trunnions $a$, cast upon it at one end and designed to be seated in bracket-bearings under the end of the car.

The steam-inlet A' is threaded, as indicated, and $a'$ represents the obliquely-directed way or opening, which is threaded for the connection of the joint of the steam-brake coupling-pipe indicated at B. The interior of this valve-case is provided with the circular beveled inlet-valve seat $a''$. The open end of the valve-case at A'' is threaded for the reception of the outlet-valve-seat plug C, which is threaded at $c$ to engage the end A'' of the valve-case A. The valve-seat plug extends in the direction of the longitudinal axis of the valve-case, and is provided with a stop-shoulder C', which when said valve-seat plug is screwed home engages the outer end of the valve-case A.

E represents the wrench-seat of the valve-seat plug. The valve-seat plug is provided with axial bearings at $g$ and $g'$ for the valve-stem H, and between these bearings is the chamber G, from which extends through the wall of the valve-seat plug an outlet-perforation or steam-vent $e$. The valve-stem H is threaded at $h$, near its valve end, to engage the threaded inner bearing $g$ of the valve-plug, and its outer end is provided with a handle whereby the stem may be turned. The valve-stem is provided with an inner valve $h''$, the beveled face of which is directed inward, as indicated, so that when the valve-stem is turned in the proper direction to carry it farther into the valve-case, it will engage the inlet-valve seat $a''$, and the valve-stem is provided with a second valve $h'$, the beveled face of which is directed outward or toward the seat C'' of the valve-seat plug, facing therefore in the opposite direction to the valve $h$. When the valve-stem is turned outward the valve $h''$ leaves the inlet-seat, and its valve $h'$ is moved toward the outlet-seat C'' of the valve-seat plug, which if the stem is turned sufficiently it engages, preventing the escape of steam into the vent-chamber G of the valve-seat plug, and thus forcing it to pass into the steam coupling-pipes. The valves $h'$ and $h''$ are located a short distance apart on the end portion of the valve-stem, this being usually about half an inch; but the distance between the inlet-valve seat $a''$ and the outlet-valve seat C'' is much greater, usually an inch or more. Between the two valve-seats is the enlarged chamber A'''' of the valve-case, which is of greater diameter than the valves $h$ and $h'$, in order to afford free passage of steam around these valves. From this enlarged chamber A'''' extends the obliquely-directed steam opening or way $a'$.

In order to afford communication between the steam-chamber A'''' of the valve-case and the vent-chamber G of the valve-seat plug, the latter is provided with a longitudinal steam-passage at $m$, cutting the threads of the seat $g$, and extending deeper than said threads into the wall of the plug, so that the steam can pass freely from the chamber A'''' to the chamber G, when the valves $h'$ and $h''$ are disengaged from their seats by turning the valve-stem, so that they are held in an intermediate position between them.

In the outer end of the valve-seat plug in the wall of the outer seat $g'$ of the valve-stem is made an annular recess $g''$ for the reception of a small packing-ring, as indicated at v. This packing-ring serves to prevent the escape of steam at this end of the plug where the handle of the valve-stem is located, and protects the hand of the operator. No stuffing-box is required.

When the cars of the train are coupled up for heating, the valve-stems are turned, so that their valves $h'$ are in engagement with the valve-seats $C''$, and the escape of steam is prevented. Now, in introducing another car into the train or adding an additional car at the end, it is designed by means of the devices described to preserve steam and facilitate the manipulation of the couplings. To this end, before the couplings are separated the valve-stems are turned to close the inlet-valve seats of the valve-cases. This permits the opening of the outlet-valve seats, when the steam in the couplings passes off through the chambers $A'''$, passages $m$, chambers G, and vents $e$, thus freeing the couplings of steam, so that they can be handled with facility in the operations of separating and connecting the same.

Having described this invention, what I claim, and desire to secure by Letters Patent, is—

In a double-acting relief-valve, the combination of the valve-case having the inlet-valve seat and the outlet-opening adapted to permit of the connection therewith of a coupling-pipe, the valve-seat plug having a steam-chamber and a vent-opening, and the valve having a double face, one engaging a seat at the inlet-end of said case and the other engaging a seat on the inner end of said plug, the screw-thread way for the screw-threaded portion of the valve-stem having a steam-passage communicating with a chamber intermediate of the valve-seats and the steam-chamber of said plug, substantially as set forth.

In testimony whereof I affix my signature in presence of two witnesses.

THOS. W. MORAN.

Witnesses:
   PHILIP C. MASI,
   C. L. TAYLOR.